US008811521B2

(12) United States Patent
Chen et al.

(10) Patent No.: US 8,811,521 B2
(45) Date of Patent: Aug. 19, 2014

(54) METHOD AND APPARATUS FOR FEEDING BACK AND CONSTRUCTING CORRELATION MATRIX IN MULTI-INPUT MULTI-OUTPUT SYSTEMS

(75) Inventors: Jinhui Chen, PuDong Jinqiao Shanghai (CN); Di Lv, PuDong Jinqiao Shanghai (CN); Yang Song, PuDong Jinqiao Shanghai (CN); Dong Li, PuDong Jinqiao Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 32 days.

(21) Appl. No.: 13/639,460

(22) PCT Filed: Apr. 7, 2010

(86) PCT No.: PCT/CN2010/071596
§ 371 (c)(1),
(2), (4) Date: Oct. 4, 2012

(87) PCT Pub. No.: WO2011/124024
PCT Pub. Date: Oct. 13, 2011

(65) Prior Publication Data
US 2013/0022146 A1   Jan. 24, 2013

(51) Int. Cl.
*H04L 23/02* (2006.01)

(52) U.S. Cl.
USPC .......................................... 375/267; 375/150

(58) Field of Classification Search
CPC ........................... H04B 7/0479; H04B 7/0482
USPC ........................................................ 375/267
See application file for complete search history.

(56) References Cited

U.S. PATENT DOCUMENTS

| | | | |
|---|---|---|---|
| 2005/0177588 A1* | 8/2005 | Rossi et al. | 707/101 |
| 2005/0249151 A1 | 11/2005 | Takano | |
| 2005/0286663 A1 | 12/2005 | Poon | |
| 2008/0192853 A1 | 8/2008 | Kent et al. | |
| 2008/0317145 A1 | 12/2008 | Clerckx et al. | |
| 2009/0233559 A1 | 9/2009 | Guey et al. | |
| 2009/0323849 A1 | 12/2009 | Bala et al. | |
| 2010/0046650 A1* | 2/2010 | Jongren et al. | 375/260 |

(Continued)

FOREIGN PATENT DOCUMENTS

| | | |
|---|---|---|
| CN | 1914842 A | 2/2007 |
| CN | 1973473 A | 5/2007 |

(Continued)

OTHER PUBLICATIONS

International Search Report for PCT/CN2010/071596 dated Jan. 13, 2011.

(Continued)

*Primary Examiner* — Santiago Garcia
(74) *Attorney, Agent, or Firm* — Fay Sharpe LLP

(57) ABSTRACT

The present invention provides a method for feeding back a correlation matrix in a multi-input multi-output system, comprising: constructing codebooks for the correlation matrix based on a conjugation nature of the correlation matrix and based on a predetermined relationship between diagonal elements and off-diagonal elements in the correlation matrix; selecting a codeword from the constructed codebook; and feeding back a corresponding index of the selected codeword in the codebook. Through the present invention, the throughput of the multi-input multi-output system can be enhanced, while reducing the encoder complexity or transfer load.

15 Claims, 4 Drawing Sheets

(56) References Cited

U.S. PATENT DOCUMENTS

| | | | |
|---|---|---|---|
| 2010/0232525 A1* | 9/2010 | Xia et al. | 375/259 |
| 2011/0013712 A1* | 1/2011 | Martin et al. | 375/267 |
| 2011/0085610 A1* | 4/2011 | Zhuang et al. | 375/260 |
| 2011/0299622 A1* | 12/2011 | Jian et al. | 375/295 |
| 2012/0300702 A1* | 11/2012 | Chen et al. | 370/328 |
| 2013/0022139 A1* | 1/2013 | Chen et al. | 375/260 |
| 2013/0051487 A1* | 2/2013 | Liu et al. | 375/267 |
| 2013/0088981 A1* | 4/2013 | Lv et al. | 370/252 |

FOREIGN PATENT DOCUMENTS

| | | |
|---|---|---|
| CN | 101212281 A | 7/2008 |
| CN | 101262456 A | 9/2008 |
| CN | 101273599 A | 9/2008 |
| CN | 101395875 A | 3/2009 |
| CN | 101442351 A | 5/2009 |
| EP | 1 956 780 | 8/2008 |
| WO | 2007/102760 | 9/2007 |
| WO | WO 2009/075662 A1 | 6/2009 |

OTHER PUBLICATIONS

Alcatel-Lucent Shanghai Bell et al., "Correlation-Based Feedback," 3GPP TSG RAN WG1 Meeting #60, San Francisco, USA, Feb. 22, 2010 to Feb. 26, 2010, XP050418528.

Alcatel-Lucent Shanghai Bell et al., "Evaluation of Correlation-Matrix Based Feedback Approach to Enhanced Feedback," 3GPP TSG RAN WG1 Meeting # 60bis, Beijing, China, Apr. 12, 2010 to Apr. 14, 2010, XP050419714.

Motorola, "Efficient Feedback of Spatial Covariance Information," 3GPP TSG RAN1 #60, San Francisco, USA, Feb. 22, 2010 to Feb. 26, 2010, XP050598048, pp. 1-7.

Samsung, "Comparisons and Performance Evaluation of Differential Feedback Proposals for Rel. 8 PMI Enhancements," 3GPP TSG RAN WG1 Meeting #59bis, Valencia, Spain; Jan. 18, 2010 to Jan. 22, 2010, XP050417847.

Search Report for corresponding European Application No. 10849261.2, dated Aug. 21, 2013.

\* cited by examiner

METHOD AND APPARATUS FOR FEEDING BACK AND CONSTRUCTING CORRELATION MATRIX IN MULTI-INPUT MULTI-OUTPUT SYSTEMS

FIELD OF THE INVENTION

The present invention relates to the field of communication, and more specifically, relates to a method and apparatus for feeding back and constructing a correlation matrix in a multi-input multi-output system.

BACKGROUND OF THE INVENTION

Traditionally, in a multi-user multi-input multi-output (MU-MIMO) system, particularly in a closed-loop MIMO system, fast feedback of a precoding matrix index (PMI) is generally required, such that a sending end finds its own precoding vector for weighting in a codebook based on the PMI.

However, the performance of the MU-MIMO system cannot be ideally exploited only using the PMI feedback. Experiments already demonstrate that correlation matrix aided MU-MIMO systems with PMI feedback outperform an MU-MIMO system with only PMI feedback.

A quantization process may be utilized in a correlation matrix aided downlink MU-MIMO system, wherein a base station (BS) requires a correlation matrix of downlink sub-channels (to a user equipment UE). In a frequency division duplexing (FDD) digital system, it is necessary to quantize a correlation matrix so as to feed back the correlation matrix from a UE to a BS. Both overhead and precision should be considered to design a desired quantization scheme on correlation matrix feedback. The higher is the precision, the greater is the system overhead; but the cost is increase of the system complexity.

In the IEEE 802.16m specification, a correlation matrix quantization approach has been proposed for a 4×4 antenna array, wherein the quantization approach adopts 28 bits for quantization. However, the current correlation matrix quantization approach in the IEEE 802.16m does not sufficiently exploit the potential and performance of the correlation matrix.

SUMMARY OF THE INVENTION

One of the objectives of the present invention lies in providing a technical solution that can overcome the drawbacks in the prior art and can realize enhancement of throughput but decrease of errors.

According to a first aspect of the present invention, there is provided a method for feeding back a correlation matrix in a multi-input multi-output system. The method may comprise: constructing codebooks for the correlation matrix based on a conjugation nature of the correlation matrix and based on a predetermined relationship between diagonal elements and off-diagonal elements in the correlation matrix; selecting a codeword from the constructed codebooks; and feeding back a corresponding index of the selected codeword in the codebooks.

According to one embodiment of the present invention, the constructing comprises: dividing elements of the correlation matrix into a first group of values, a second group of values, and a third group of values; constructing a first codebook represented by an l-bit index, a second codebook represented by an m-bit index, and a third codebook represented by an n-bit index for the first group of values, the second group of values, and the third group of values, respectively, wherein l, m, and n≥0.

According to one embodiment of the present invention, the first group of values denotes diagonal elements values (which is a positive real number) of the correlation matrix, the second group of values denotes off-diagonal correlation coefficient magnitudes $r_{ij}$ (which is a positive real number less than 1) of the correlation matrix, and the third group of values denotes off-diagonal correlation coefficient phases $\theta_{ij}$ (in a range of $[0, 2\pi)$) of the correlation matrix; wherein i and j denote indexes of rows and columns of the correlation matrix, respectively; and the off-diagonal elements $R_{ij}$ in the correlation matrix is represented by $$R_{ij} = \sqrt{R_{ii}R_{jj}} r_{ij} e^{j\theta_{ij}} (i \neq j).$$

According to one embodiment of the present invention, the first correlation matrix has a N×N dimension, wherein N denotes the amount of transmit antennas or receive antennas in the multi-input multi-output system; amounts of the fed back indexes in the first codebook, the second codebook and the third codebook are N, N(N−2)/2 N(N−1)/2, respectively, which correspond to lN bits, $$\frac{mN(N-1)}{2}$$

bits, and $$\frac{mN(N-1)}{2}$$

bits, respectively, such that the total bits as fed back is $$lN + \frac{mN(N-1)}{2} + \frac{nN(N-1)}{2}.$$

According to one embodiment of the present invention, the values of l, m, and n are selected from one of the following combinations: {l=0, m=0, n=3}; {l=2, m=1, n=3}; {l=2, m=0, n=4}; and {l=2, m=2, n=5}.

According to one embodiment of the present invention, there is further comprised a normalization step in which elements of the correlation matrix is normalized using a maximum value on the correlation matrix diagonal line before constructing codebooks.

According to one embodiment of the present invention, the method is implemented at a user equipment.

According to a second aspect of the present invention, there is provided a method for constructing a second correlation matrix in a multi-input multi-output system. The method may comprise: constructing codebooks for a first correlation matrix based on a conjugation nature of the first correlation matrix and a predetermined relationship between diagonal elements and off-diagonal elements in the correlation matrix; receiving an index of a codeword in the first correlation matrix; obtaining a corresponding codeword from the constructed codebooks for the first correlation matrix; and constructing a second correlation matrix corresponding to the first correlation matrix based on the obtained codeword.

According to a third aspect of the present invention, there is provided an apparatus for feeding back a correlation matrix in a multi-input multi-output system. The apparatus comprises:

a constructing module configured to construct codebooks for the correlation matrix based on a conjugation nature of the correlation matrix and based on a predetermined relationship between diagonal elements and off-diagonal elements in the correlation matrix; a selecting module configured to select a codeword from the constructed codebooks; and a feedback module configured to feed back a corresponding index of the selected codeword in the codebooks.

According to a fourth aspect of the present invention, there is provided an apparatus for constructing a second correlation matrix in a multi-input multi-output system. The apparatus may comprise: a constructing module configured to construct codebooks for a first correlation matrix based on a conjugation nature of the first correlation matrix and a predetermined relationship between diagonal elements and off-diagonal elements in the correlation matrix; a receiving module configured to receive an index of a codeword in the first correlation matrix; an obtaining module configured to obtain a corresponding codeword from the constructed codebooks for the first correlation matrix, and a constructing module configured to construct a second correlation matrix corresponding to the first correlation matrix based on the obtained codeword.

According to a fifth aspect of the present invention, there is provided a method of feeding back and constructing a correlation matrix in a multi-input multi-output system comprising a receiving end and a sending end. The method comprises: constructing, at the receiving end and the sending end, codebooks for the correlation matrix based on a conjugation nature of the correlation matrix and a predetermined relationship between diagonal elements and off-diagonal elements in the correlation matrix; selecting, at the receiving end, a codeword representing a to-be-fed-back correlation matrix from the constructed codebooks; feeding back an index for the selected codeword in the correlation matrix to the sending end; receiving, at the sending end, the index of the selected codeword in the correlation matrix; obtaining the corresponding codeword from the constructed codebooks based on the index; and constructing a similar correlation matrix with respect to the correlation matrix based on the obtained codeword.

The methods and apparatuses as provided in the present invention are consistent with the current downlink MU-MIMO topic under discussion, and thus they are very important for the definition of standardization. An advantage of the present invention further lies in that it is a universal design scheme such that it is applicable in various circumstances; it almost can fully exploit the potential of a correlation matrix, thereby reducing redundant overheads. Due to considering relevant properties, the present invention facilitates designing a more appropriate quantization scheme.

DETAILED DESCRIPTION OF EMBODIMENTS

Hereinafter, preferred embodiments of the present invention will be described in detail with reference to the drawings.

Figure 1:
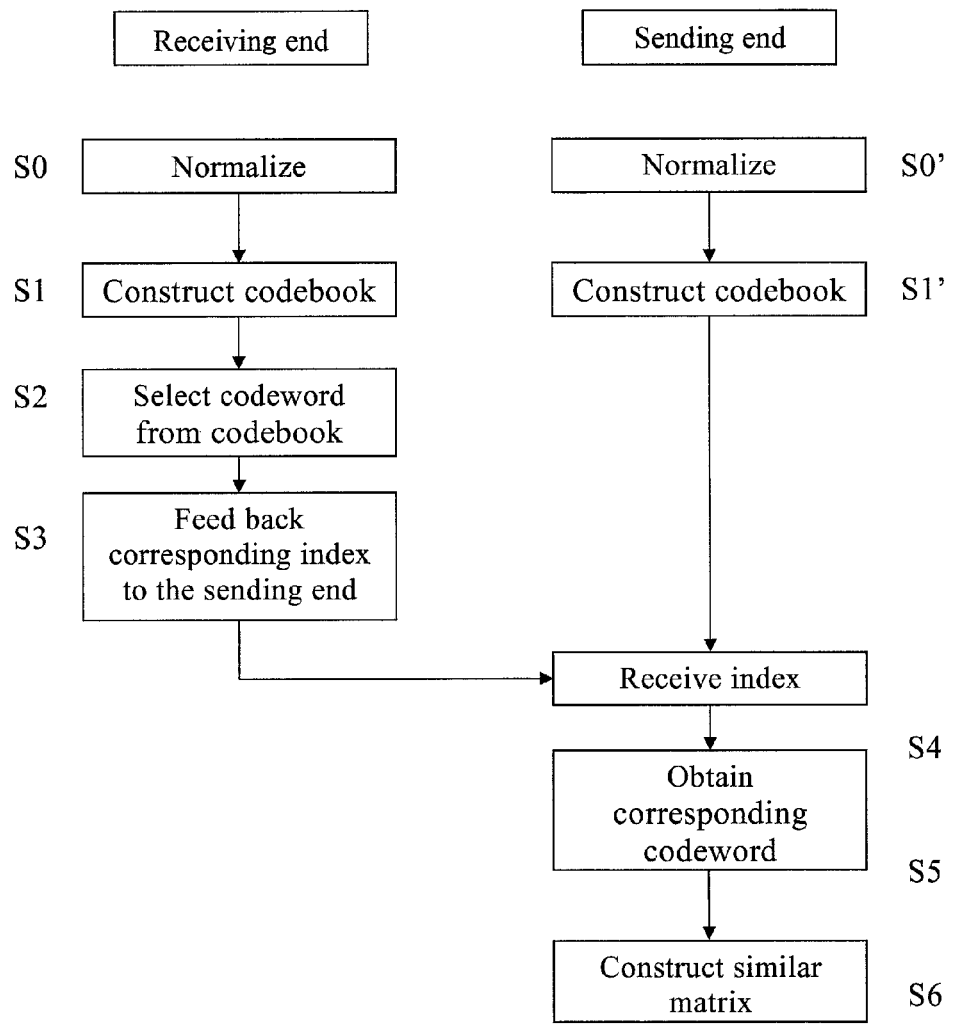
FIG. 1 illustrates an overall schematic diagram of signal transmission between a sending end and a receiving end of a multi-input multi-output (MIMO) communications system according to one embodiment of the present invention.

FIG. 1 illustrates an overall schematic diagram of signal transmission between a sending end and a receiving end of a multi-input multi-output (MIMO) communications system according to one embodiment of the present invention. According to one embodiment of the present invention, the sending end here may be a base station (BS) in the multi-input multi-output (MIMO) system, while the receiving end may be a user equipment (UE) in the MIMO system.

At the receiving end, for example at the UE, it may have a correlation matrix representing an antenna array in the MIMO system. The dimension of the correlation matrix is assumed as N×N, wherein N denotes the amount of transmit antennas or receive antennas in the multi-input multi-output system, i.e., the MIMO system has N transmit antennas and N receive antennas.

It should be noted that the UE may obtain the correlation matrix through channel measurement, which is known to those skilled in the art and thus will not be detailed here so as to prevent impact on the essence of the present invention.

In order to understand the present invention more clearly, equation (1) provides an exemplary matrix expression for the correlation matrix R:

$$R = \begin{bmatrix} R_{11} & R_{12} & R_{13} & R_{14} \\ conj(R_{12}) & R_{22} & R_{23} & R_{24} \\ conj(R_{13}) & conj(R_{23}) & R_{33} & R_{34} \\ conj(R_{14}) & conj(R_{24}) & conj(R_{34}) & R_{44} \end{bmatrix} \quad (1)$$

It is seen that the matrix is a 4×4 matrix, i.e., having 4 transmit antennas and 4 receive antennas. In this matrix, the diagonal elements are positive real numbers while the off-diagonal elements are all complex numbers. The symbol "conj" in the matrix denotes conjugation, for example conj ($R_{23}$) denotes the conjugation of the element $R_{23}$; thus, the off-diagonal elements in the correlation matrix R are symmetrical about the diagonal line. Due to the symmetrical nature of the correlation matrix R, it is only required that the receiving end (for example UE) feeds back the diagonal elements in the correlation matrix and respective elements in the upper triangle, and the sending end (for example, BS) may construct a correlation matrix similar to that in the receiving end based on the obtained feedback. It should be noted that the "similar" here means a certain quantization error exists, but from the perspective of the overall structure of the matrix, the correlation matrices at the receiving end and the sending end are identical.

Further, it may be seen from equation (1) that it is required to feed back the N diagonal elements (4 in equation (1)) and N(N−2)/2 off-diagonal elements (6 in equation (1)) of the correlation matrix to the sending end. Therefore, the bit numbers what are required to feed back correlate to the number of elements that are required to feed back in the matrix, which will be described in detail hereinafter. The structure of the correlation matrix is known to those skilled in the art, which will not be detailed here.

With reference to FIG. 1, as indicated by reference numerals S1 and S1', according to one embodiment of the present invention, at the receiving end (for example, UE) and the sending end (BS), codebooks for a correlation matrix are constructed based on a conjugation nature of the correlation matrix and a predetermined relationship between diagonal elements and off-diagonal elements in the correlation matrix. Such constructed codebooks may be pre-stored at the receiving end and the transmitting end for subsequent use.

In the prior art, for example, in the IEEE 802.16m specification, the codebook is only constructed by using an inherent conjugation symmetrical nature of the correlation matrix, without considering the relationship between off-diagonal elements and diagonal elements. However, the present invention considers such relationship, such that it is more refined during the constructing process; therefore, the feedback approach of the present invention is more efficient than the feedback approach as used in the IEEE 802.16m specification.

Figure 2:
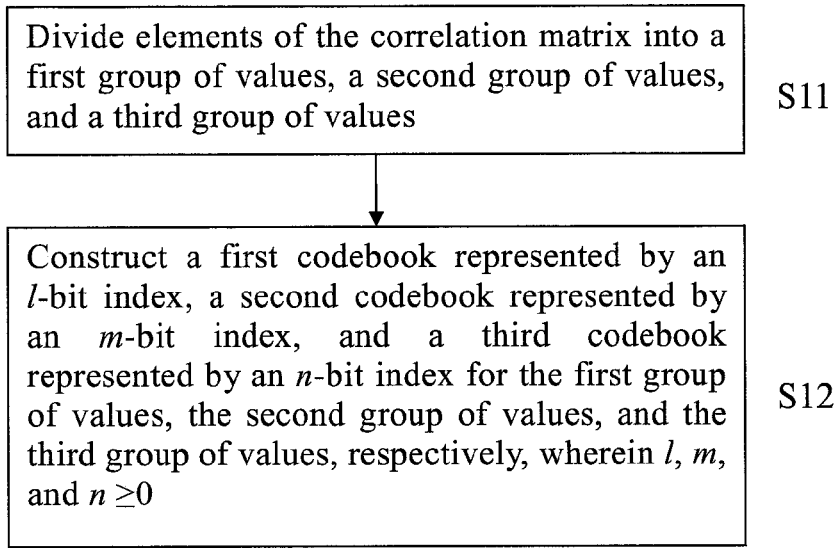
FIG. 2 illustrates one embodiment according to the first aspect of the present invention.

Further, according to one embodiment of the present invention, as shown in FIG. 2, constructing codebooks for a correlation matrix comprises: step S11 in which elements of the correlation matrix are divided into a first group of values, a second group of values, and a third group of values; and step S12 in which a first codebook represented by a l-bit index, a second codebook represented by an m-bit index, and a third codebook represented by a n-bit index are constructed for the first group of values, the second group of values, and the third group of values, respectively, wherein l, m, and n≥0.

To illustrate by comparison, equation (2) provides an expression (2) for quantizing each element in the correlation matrix at the sending end in the existing IEEE 802.16m specification:

$$R_{ij} = \alpha \cdot e^{(j \cdot b \cdot 2\pi)}, i=0, \ldots N-1, i \leq j \quad (2)$$

It may be seen that in the existing IEEE 802.16m specification, the correlation matrix is divided into two groups denoted by a and b, respectively, to wait for quantization; thus, it is only required to construct codebooks for group a and group b, respectively. For more details, please refer to the specific prescription in the IEEE 802.16m specification.

In contrast, according to one embodiment of the present invention, the first group of values of FIG. 2 denotes diagonal element values $R_{ii}$ (which is a positive real number) of the correlation matrix, which has been discussed above.

The second group of values denotes off-diagonal correlation coefficient magnitudes $r_{ij}$ (which is a positive real number less than 1) of the correlation matrix.

The third group of values denotes off-diagonal correlation coefficient phases $\theta_{ij}$ (in a range of $[0, 2\pi)$ of the correlation matrix; wherein i and j denote indexes of rows and columns of the correlation matrix, respectively; and the off-diagonal elements $R_{ij}$ in the correlation matrix is represented by $R_{ij} = \sqrt{R_{ii}R_{jj}} r_{ij} e^{j\theta_{ij}}$ (i<j).

It should be understood that the range of the diagonal correlation coefficient phases $\theta_{ij}$ may also be other value, for example $[-\pi, \pi)$, etc.

Therefore, all elements in the correlation matrix may be expressed as the following equation (3):

$$R_{ij} = \begin{cases} R_{ii} & i = j \\ \sqrt{R_{ii}R_{jj}} r_{ij} e^{j\theta_{ij}} & i < j \\ conj(R_{ji}) & i > j \end{cases} \quad (3)$$

Further return to FIG. 1, after codebooks for the correlation matrix is constructed based on a conjugation nature of the correlation matrix and a predetermined relationship between diagonal elements and off-diagonal elements in the correlation matrix, at step S2, a codeword is selected from the constructed codebooks. According to one embodiment of the present invention, a codeword in the codebooks can be quantized into levels, which is known to those skilled in the art and will thus not be detailed here.

Next, at step S3, a corresponding index of the selected codeword in the codebooks is fed back to the sending end.

It should be noted that, due to the symmetrical nature of the correlation matrix, it is required to feed back the indexes of the N-diagonal elements and N(N−2)/2 off-diagonal elements from the receiving end to the sending end. Thus, after the correlation matrix is divided into three groups of values, the fed back amounts of the indexes in the first codebook, the second codebook, and the third codebook are N, N(N−2)/2, and N(N−1)/2, respectively. Because the indexes of the three codebooks are represented by l bits, m bits, and n nits, respectively, they correspond to lN bits, $$\frac{mN(N-1)}{2}$$

bits, and $$\frac{nN(N-1)}{2}$$

bits, respectively; therefore, the total fed back amount of bits is $$lN + \frac{mN(N-1)}{2} + \frac{nN(N-1)}{2}.$$

Thus, the encoder complexity in the receiving end is $$NC(l) + \frac{N(N-1)}{2}C(m) + \frac{N(N-1)}{2}C(n),$$

where C(x) represents the processing complexity from an x-bit codebook, and C(x) is expressed as $C(2)=2^{2x}-1$.

Further, according to one embodiment of the present invention, as indicated by alternative steps S0 and S0' in FIG. 1, alternatively, before constructing the codebooks (i.e., before step S1) or during step S1, elements of the correlation matrix are normalized using a maximum value on diagonal line of the correlation matrix.

It should be noted that the normalization in the present invention is different from the normalization approach in the prior art, for example, the IEEE 802.16m specification. Equation (4) shows a quantization method in the IEEE 802.16m:

$$\tilde{R} = R/\max\{abs(R_{ij})\} \quad (4)$$

It is seen from equation (4) that the normalization approach in the IEEE 802.16m is performed using a maximum value among the absolute values of all elements in the correlation matrix, while in the present invention, the normalization is performed using a maximum value among diagonal elements. This point is significantly different from the IEEE 802.16m.

Next, continue referring to FIG. 1, as illustrated in step S4, the sending end (for example, BS) receives an index of a codeword of the correlation matrix as fed back from the receiving end (for example UE); next, as shown in S5, at the sending end, a corresponding codeword (as shown in S1') is obtained from the previously constructed codebooks for the correlation matrix based on the received index; then, as shown in S6, at the sending end, a correlation matrix similar to or corresponding to the previous correlation matrix is constructed based on the obtained codeword. Those skilled in the art would appreciate that the "similar" here means a certain quantization error exists, but from the perspective of the overall structure of the matrix, the correlation matrices at the receiving end and the sending end are identical.

Hereinafter, improvement of the present invention on system performance over the prior art in a general MIMO system will be described with a more specific instance.

A first example of the present invention adopts the following parameters, i.e., in an urban micro-cellular communication model (UMI) scenario, suppose a distance between antennas is 0.5 wavelength, N=4 (the antennas have a 4×4 array), l=2, m=0, n=4, and suppose all random factors have been normalized and are independent from one another, and the random factors in each group are distributed identically. Codebooks for three group of values are provided below.

Table 1 shows codebook for Diagonal Elements when l=2.

TABLE 1

Codebook for Diagonal Elements

| Indices | Quantization Values (codewords) |
|---|---|
| 00 | 0.3 |
| 01 | 0.6 |
| 10 | 0.9 |
| 11 | 1 |

It should be noted that the quantization values here may be even or uneven. For example, the above quantization values may be (0.25, 0.5, 0.75, 1), etc. Those skilled in the art may set a desired quantization value empirically or as required.

Therefore, based on lN, the number of bits for feeding back the diagonal elements is 8 bits (2×4).

According to the first example of the present invention, let the diagonal correlation coefficient magnitude $r_{ij}$ be fixedly 0.7, i.e., m=0. The total number of bits for the correlation coefficient magnitude is also 0 bits.

Further, according to the first example of the present invention, when n=4, the codebook for quantizing the off-diagonal correlation coefficient phases $\theta_{ij}$ is shown in Table 2:

TABLE 2 codebook for off-diagonal correlation coefficient phase

| Indices | Quantization Values (Codewords) |
|---|---|
| 0000 | $1/8\pi$ |
| 0001 | $1/4\pi$ |
| 0010 | $3/8\pi$ |
| 0011 | $1/2\pi$ |
| 0100 | $5/8\pi$ |
| 0101 | $3/4\pi$ |
| 0110 | $7/8\pi$ |
| 0111 | $\pi$ |
| 1000 | $9/8\pi$ |

TABLE 2-continued codebook for off-diagonal correlation coefficient phase

| Indices | Quantization Values (Codewords) |
|---|---|
| 1001 | $5/4\pi$ |
| 1010 | $11/8\pi$ |
| 1011 | $3/2\pi$ |
| 1100 | $13/8\pi$ |
| 1101 | $7/4\pi$ |
| 1110 | $15/8\pi$ |
| 1111 | $2\pi$ |

Therefore, based on $$\frac{nN(N-1)}{2},$$

it may be derived that the number of feedback bits for the off-diagonal correlation coefficient phases $\theta_{ij}$ is 24 bits.

Therefore, in the case of 4 antennas (i.e., N=4), this example of the present invention needs 32 bits for feedback in total.

Hereinafter, the system performances of the present invention adopting 32 bits, an ideal quantization and IEEE 802.16m quantization scheme are compared under the same transmission condition through simulation.

First, simulation and comparison are made on a physical layer.

As shown in Table 3, it provides the environment for simulation.

TABLE 3 physical layer simulation configuration

| Parameter | Value |
|---|---|
| Channel Model | ITU Urban Micro |
| Antenna Configuration | 4-transmit-antenna eNB: ULA (uniform linear array), 0.5 lambda |
| | 2-receive-antenna UE: ULA, 0.5 lambda |
| Duplex method | FDD |
| Channel estimation | Ideal channel estimation |
| Feedback Impairments | CQI/PMI reporting period: 5 ms |
| | Transmitting correlation reporting period: 20 ms |
| | CQI/PMI feedback: subband (5 resource blocks RB) |
| | Transmitting correlation feedback: wideband |
| | Delay: 6 ms |
| Downlink precoding scheme | Multiuser eigenmode transmission (MET) algorithm |
| Base codebook | 3GPP LTE Rel-8, 4 bits codebook for 4Tx |

Here, the values of respective parameters are known to those skilled in the art and therefore will not be detailed here.

Table 4 shows a simulation result of an average direction error as obtained in the simulation process. It is seen that compared with the 28-bit quantization scheme in IEEE 802.16m, the 32-bit quantization scheme as adopted by embodiments of the present invention is lower about 10% in terms of average direction error.

TABLE 4

Comparison on Average Direction Errors on the Physical Layer

| Ideal quantization | 802.16m quantization scheme | Quantization scheme of the present invention |
|---|---|---|
| 0.0344 | 0.0807 | 0.0714 |

Hereinafter, simulation on the link layer is performed so as to compare the block error rates (BLER) in the ideal quantization, 802.16m quantization scheme and the quantization scheme in the present invention. Table 5 illustrates the link layer simulation configuration.

TABLE 5 link layer simulation configuration

| Parameters | Values |
|---|---|
| Transmission scheme | Coherent joint transmission mode of DL CoMP |
| BS number and antenna configuration | 2 BSs, each equipped with 4 transmit antennas and antenna spacing is 0.5 wavelength |
| UE number and antenna configuration | 4 UEs, each equipped with 2 receive antennas and antenna spacing is 0.5 wavelength |
| Modulation | 16QAM |
| Channel coding | ½ Turbo coding |
| MU Precoding method | MET algorithm |
| CSI feedback delay | 6 ms |
| Tx correlation reporting period | 20 ms |
| Resource for transmission | 5 LTE PRBs in frequency domain |
| Channel estimation | Ideal |
| Data detection | MMSE |
| Velocity | 3 kmph |
| Fast fading channel model | ITU CDL channel model with scenario of UMi |
| Large scale channel model | Not simulated (that is, it is assumed that the path loss and shadowing fading of all the 4 UEs from the 2 BSs are the same). |
| Frames simulated | 1000 |
| Block size for BLER | 584 bits |
| Base codebook | 3GPP LTE Rel-8, 4 bits codebook for 4Tx |

Here, the values of respective parameters are known to those skilled in the art and therefore will not be detailed here.

Figure 3:
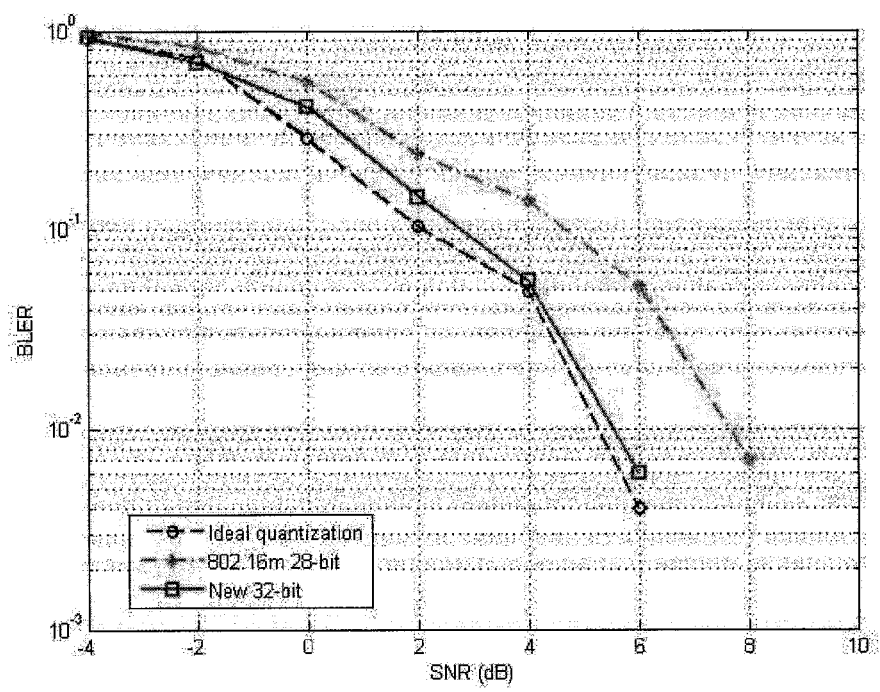
FIG. 3 illustrates a simulation result of BLER with respect to signal-to-noise ratio (SNR) in a link layer according to one embodiment of the present invention.

FIG. 3 illustrates a simulation result of BLER with respect to signal-to-noise ratio (SNR) in a link layer according to one embodiment of the present invention. It is seen that compared with the 28-bit quantization scheme in IEEE 802.16m, the present 32-bit quantization scheme is significantly better and closer to the ideal quantization scheme.

Hereinafter, simulation on the system layer is performed so as to compare the throughput in the ideal quantization, 802.16m quantization scheme and the quantization scheme in the present invention. Table 6 illustrates the system layer simulation configuration.

TABLE 6

System Layer Simulation Configuration

| Parameters | Values |
|---|---|
| Channel Model | ITU Urban Micro |
| Antenna Configuration | 4-Tx eNB: ULA, 0.5 lambda 2-Rx UE: ULA, 0.5 lambda |
| Duplex method | FDD |
| Scheduler | Proportional fair and frequency selective scheduling; Scheduling granularity of one subframe |
| Link adaptation | Non-ideal CQI (i.e. feedback CQI is quantized according to MCS levels) |
| Channel estimation | Ideal channel estimation |
| Feedback Impairments | CQI/PMI reporting period: 5 ms Tx correlation reporting period: 20 ms CQI/PMI feedback: subband (5 RB) Tx correlation feedback: wideband Delay: 6 ms |
| Downlink precoding scheme | Multiuser eigenmode transmission (MET) |
| Rate Metric | Constrained capacity based on the QPSK, 16QAM, 64QAM constellations s |
| Downlink HARQ | Synchronous HARQ, CC, maximum four transmissions |
| Control channel and reference signal overhead: | Fixed 0.3026 (As agreed in ITU evaluation) |
| Base codebook | 3GPP LTE Rel-8 4 bits codebook for 4Tx |

Here, the values of respective parameters are known to those skilled in the art and therefore will not be detailed here.

Table 7 illustrates a simulation result of throughput in the system layer. It is seen that the present 32-bit quantization system significantly outperforms the 28-bit quantization scheme in IEEE 802.16m, and the throughput of the present invention is about 10% higher than that of the IEEE 802.16m quantization scheme.

TABLE 7

Comparison of Throughputs at the System Layer

| Ideal quantization | 802.16m quantization scheme | The present quantization scheme |
|---|---|---|
| 3.216 | 2.867 | 3.144 |

In order to further exploit the potential of the correlation matrix, the present invention makes further comparison with other exemplary scenarios. Table 8 provides a comparison on throughput in the system layer in other three exemplary scenarios. It should be noted that the simulation results of Table 8 are all based on the configuration as shown in Table 6.

TABLE 8

Throughput Comparison at the System Layer

| Quantization Schemes | Throughput |
|---|---|
| No correlation matrix feedback | 2.62 (100%) |
| Ideal state | 3.22 (122.9%) |
| IEEE 8021.16m (28-bit) | 2.88 (109.9%) |
| Example 1 (18-bit) | 2.85 (108.8%) |
| Example 2 (32-bit) | 3.13 (119.5%) |
| Example 3 (50-bit) | 3.21 (122.5%) |

It should be further noted that in Example 1 of Table 8, the diagonal values of the correlation matrix are fixed to be 1, and the off-diagonal correlation coefficient magnitudes are fixed to be 0.6; thus, the codebooks for the two values are both 0 bits, while the codebook for the off-diagonal correlation coefficient phases is 3 bits; therefore, there may have 8 quantization values; let these quantization values be $\{r\pi/4, r=0, \ldots, 7\}$, such that the total bits for feedback in the example is 18 bits.

In Example 2 of Table 8, the diagonal quantization values of the correlation matrix are $\{0.3, 0.6, 0.9, 1\}$, such that the codebook for the diagonal quantization values is 2 bits; the quantization values of the off-diagonal correlation coefficient magnitudes of the correlation matrix are $\{0.4, 0.8\}$, and correspondingly, the codebook for the off-diagonal correlation coefficient magnitudes is 1 bit; besides, the codebook for the off-diagonal correlation coefficient phases is also 3 bits in the present example 2; the quantization values are identical in the example, i.e., $\{r\pi/4, r=0, \ldots, 7\}$. Therefore, the total bits for feedback in Example 2 are 32 bits.

In Example 3 of Table 8, the diagonal quantization values of the correlation matrix are $\{0.3, 0.6, 0.9, 1\}$, such that the codebook for the diagonal quantization values is 2 bits; the quantization values of the off-diagonal correlation coefficient magnitudes of the correlation matrix are $\{0.2, 0.5, 0.7, 0.9\}$, and correspondingly, the codebook for the off-diagonal correlation coefficient magnitudes is 2 bits; besides, the codebook for the off-diagonal correlation coefficient phases is 5 bits in the present Example 3; the quantization values are $\{r\pi/16, r=0, \ldots, 31\}$. Therefore, the total bits for feedback in Example 3 are 50 bits.

It is seen from Table 8 that in the case of Example 2, the throughput is improved over IEEE 802.16m, i.e., through increasing a 4-bit long-term feedback amount, the system throughput can be increased by 9%. Additionally, in the case of Example 3, when a 50-bit feedback is adopted, the throughout is close to the ideal state. In the case of Example 1, only a 18-bit feedback is adopted, which is about 65% of the number of bits adopted by the IEEE 802.16m, such that it can significantly reduces the encoder complexity but meanwhile can achieve a substantially identical throughput to IEEE 802.16m.

Through the above comparisons, those skilled in the art would see that adoption of the technical solution of the present invention can achieve a significant improvement of performance with the same encoder complexity, or in the case that the performance is substantially unchanged, the redundant overheads are dramatically reduced; therefore, the potential of the correlation matrix can be almost fully exploited.

Figure 4:
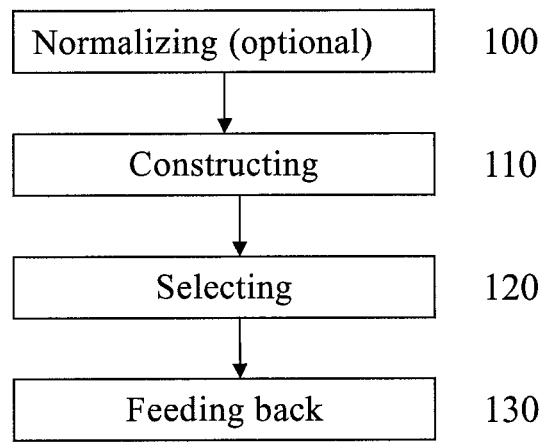
FIG. 4 illustrates a flowchart of a method according to one aspect of the present invention.

Therefore, based on the above description, as shown in FIG. 4, the present invention provides a method for feeding back a correlation matrix in a multi-input multi-output system, comprising: a constructing step 110 for constructing codebooks for the correlation matrix based on a conjugation nature of the correlation matrix and based on a predetermined relationship between diagonal elements and off-diagonal elements in the correlation matrix; a selecting step 120 for selecting a codeword from the constructed codebooks; and a feedback step 130 for feeding back a corresponding index of the selected codeword in the codebooks.

As shown in FIG. 4, the method according to one embodiment of the present invention comprises an alternative normalization step 100 for normalizing elements of the correlation matrix using a maximum value on the correlation matrix diagonal line before the constructing step.

Figure 5:
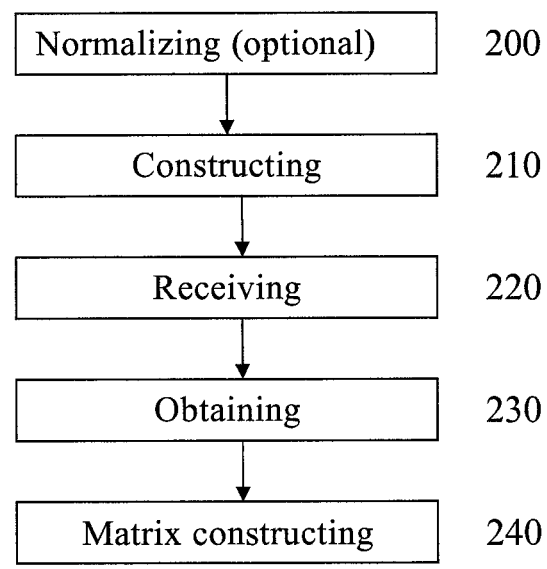
FIG. 5 illustrates a flowchart of a method according to another aspect of the present invention.

As shown in FIG. 5, the present invention further provides a method for constructing a second correlation matrix in a multi-input multi-output system, comprising: a constructing step 210 for constructing codebooks for a first correlation matrix based on a conjugation nature of the first correlation matrix and a predetermined relationship between diagonal elements and off-diagonal elements in the correlation matrix; a receiving step 220 for receiving an index of a codeword in the first correlation matrix; an obtaining step 230 for obtaining a corresponding codeword from the constructed codebooks for the first correlation matrix, and a constructing step 240 for constructing a second correlation matrix corresponding to the first correlation matrix based on the obtained codeword.

As shown in FIG. 5, the method according to one embodiment of the present invention comprises an alternative normalization step 200 for normalizing elements of the correlation matrix using a maximum value on the correlation matrix diagonal line before the constructing step.

Figure 6:
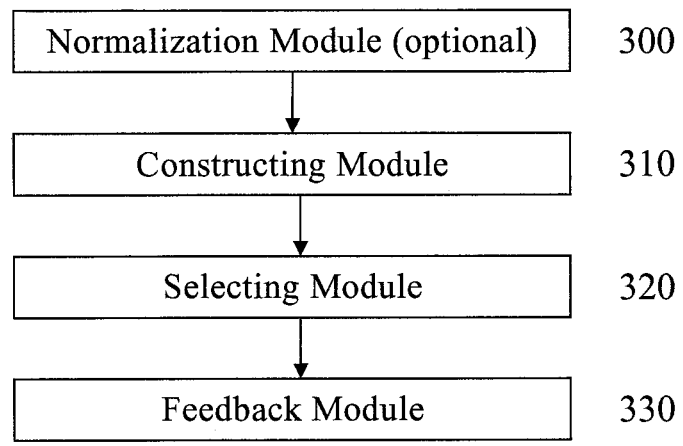
FIG. 6 illustrates a block diagram of an apparatus according to one aspect of the present invention.

As shown in FIG. 6, the present invention further provides an apparatus for feeding back a correlation matrix in a multi-input multi-output system, comprising: a constructing module 310 configured to construct codebooks for the correlation matrix based on a conjugation nature of the correlation matrix and based on a predetermined relationship between diagonal elements and off-diagonal elements in the correlation matrix; a selecting module 320 configured to select a codeword from the constructed codebooks; and a feedback module 330 configured to feed back a corresponding index of the selected codeword in the codebooks.

As shown in FIG. 6, the apparatus according to one embodiment of the present invention comprises an alternative normalization module 300 configured to normalize elements of the correlation matrix using a maximum value on the correlation matrix diagonal line before the constructing step.

Figure 7:
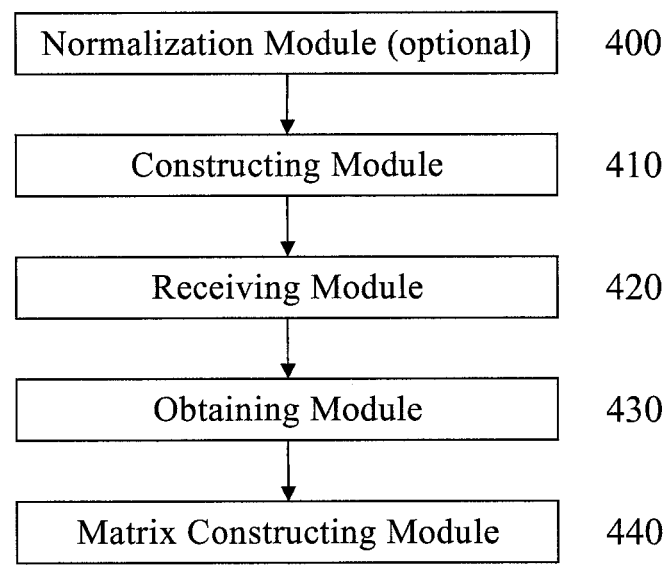
FIG. 7 illustrates a block diagram of an apparatus according to another aspect of the present invention.

Further, as shown in FIG. 7, the present invention further provides an apparatus for constructing a second correlation matrix in a multi-input multi-output system, comprising: a constructing module 410 configured to construct codebooks for a first correlation matrix based on a conjugation nature of the first correlation matrix and a predetermined relationship between diagonal elements and off-diagonal elements in the correlation matrix; a receiving module 420 configured to receive an index of a codeword in the first correlation matrix; an obtaining module 430 configured to obtain a corresponding codeword from the constructed codebook for the first correlation matrix, and a matrix constructing module 440 configured to construct a second correlation matrix corresponding to the first correlation matrix based on the obtained codeword.

As shown in FIG. 7, the method according to one embodiment of the present invention comprises an alternative normalization step 400 for normalizing elements of the correlation matrix using a maximum value on the correlation matrix diagonal line before the constructing step.

More further, the present invention further provides a method of feeding back and constructing a correlation matrix in a multi-input multi-output system comprising a receiving end and a sending end, comprising: constructing, at the receiving end and the sending end, codebooks for the correlation matrix based on a conjugation nature of the correlation matrix and a predetermined relationship between diagonal elements and off-diagonal elements in the correlation matrix; selecting, at the receiving end, a codeword from the constructed codebooks; feeding back a corresponding index for the selected codeword in the codebooks to the sending end; receiving, at the sending end, an index of the selected codeword in the correlation matrix; obtaining the corresponding codeword from the constructed codebook for the correlation matrix based on the index; and constructing a further correlation matrix corresponding to the correlation matrix based on the obtained codeword.

The above methods and apparatuses of the present invention may be implemented in any manner, including, but not limited hardware, circuit, processor, software, firmware, and various combinations thereof. It should be understood that the protection scope of the present invention is not limited to the above disclosure, but may be subjected to various modifications and transformations without departing from the scope of the present invention.

What is claimed is:

1. A method for feeding back a correlation matrix in a multi-input multi-output system, comprising:
constructing codebooks for the correlation matrix based on a conjugation nature of the correlation matrix and based on a predetermined relationship between diagonal elements and off-diagonal elements in the correlation matrix;

selecting a codeword from the constructed codebooks; and feeding back a corresponding index of the selected codeword in the codebooks;

wherein the diagonal elements in the correlation matrix are represented by $R_{ij}$ (i=j), the off-diagonal element $R_{ij}$ in the correlation matrix are represented by $R_{ij} = \sqrt{R_{ii}R_{jj}} r_{ij} e^{j\theta_{ij}}$ (i≠j), and wherein i and j denote indexes of rows and columns of the correlation matrix, respectively.

2. The method according to claim 1, wherein the constructing comprises:

dividing elements of the correlation matrix into a first group of values, a second group of values, and a third group of values; and constructing a first codebook represented by a l-bit index, a second codebook represented by an m-bit index, and a third codebook represented by a n-bit index for the first group of values, the second group of values, and the third group of values, respectively, wherein l, m, and n≥0.

3. The method according to claim 2, wherein:

the first group of values denotes diagonal elements values $R_{ii}$ of the correlation matrix, $R_{ii}$ being a positive real number;

the second group of values denotes off-diagonal correlation coefficient magnitudes $r_{ij}$ of the correlation matrix, $r_{ij}$ being a positive real number less than 1; and the third group of values denotes off-diagonal correlation coefficient phases $\theta_{ij}$ of the correlation matrix, $\theta_{ij}$ being in a range of [0, 2π).

4. The method according to claim 2, wherein the correlation matrix has a N×N dimension, wherein N denotes the amount of transmit antennas or receive antennas in the multi-input multi-output system; amounts of the fed back indexes in the first codebook, the second codebook and the third codebook are N, N(N−2)/2 and N(N−1)/2, respectively, which correspond to lN bits, $$\frac{mN(N-1)}{2}$$

bits, and $$\frac{nN(N-1)}{2}$$

bits, respectively, such that the total bits as fed back is $$lN + \frac{mN(N-1)}{2} + \frac{nN(N-1)}{2}.$$

5. The method according to claim 4, wherein the values of l, m, and n are selected from one of: {l=0, m=0, n=3}; {l=2, m=1, n=3}; {l=2, m=0, n=4}; and {l=2, m=2, n=5}.

6. The method according to claim 1, further comprising:

normalizing elements of the correlation matrix using a maximum value on the correlation matrix diagonal line before the constructing codebooks.

7. A method for constructing a second correlation matrix in a multi-input multi-output system, comprising:

constructing codebooks for a first correlation matrix based on a conjugation nature of the first correlation matrix and based on a predetermined relationship between diagonal elements and off-diagonal elements in the correlation matrix;

receiving an index of a codeword of the first correlation matrix;

obtaining a corresponding codeword from the constructed codebooks for the first correlation matrix based on the index; and constructing a second correlation matrix corresponding to the first correlation matrix based on the obtained codeword;

wherein the diagonal elements in the first correlation matrix are represented by $R_{ij}$ (i=j), the off-diagonal element $R_{ij}$ in the first correlation matrix are represented by $R_{ij} = \sqrt{R_{ii}R_{jj}} r_{ij} e^{j\theta_{ij}}$ (i≠j), and wherein i and j denote indexes of rows and columns of the correlation matrix, respectively.

8. The method according to claim 7, wherein the constructing codebooks comprises:

dividing elements of the first correlation matrix into a first group of values, a second group of values, and a third group of values; and constructing a first codebook represented by a l-bit index, a second codebook represented by an m-bit index, and a third codebook represented by a n-bit index for the first group of values, the second group of values, and the third group of values, respectively, wherein l, m, and n≥0.

9. The method according to claim 8, wherein:

the first group of values denotes diagonal elements values $R_{ii}$ of the first correlation matrix, $R_{ii}$ being a positive real number;

the second group of values denotes off-diagonal correlation coefficient magnitudes $r_{ij}$ of the first correlation matrix, $r_{ij}$ being a positive real number less than 1; and the third group of values denotes off-diagonal correlation coefficient phases $\theta_{ij}$ of the first correlation matrix, $\theta_{ij}$ being in a range of [0, 2π).

10. The method according to claim 8, wherein the first correlation matrix has a N×N dimension, wherein N denotes the amount of transmit antennas or receive antennas in the multi-input multi-output system; amounts of the fed back indexes in the first codebook, the second codebook and the third codebook are N, N(N−2)/2 and N(N−1)/2, respectively, which correspond to lN bits, $$\frac{mN(N-1)}{2}$$

bits, and $$\frac{nN(N-1)}{2}$$

bits, respectively, such that the total bits as fed back is $$lN + \frac{mN(N-1)}{2} + \frac{nN(N-1)}{2}.$$

11. The method according to claim 10, wherein the values of l, m, and n are selected from one of: {l=0, m=0, n=3}; {l=2, m=1, n=3}; {l=2, m=0, n=4}; and {l=2, m=2, n=5}.

12. The method according to claim 7, further comprising:
normalizing elements of the first correlation matrix using a maximum value on the first correlation matrix diagonal line before the constructing codebooks.

13. An apparatus for feeding back a correlation matrix in a multi-input multi-output system, comprising:
a constructing module configured to construct codebooks for the correlation matrix based on a conjugation nature of the correlation matrix and based on a predetermined relationship between diagonal elements and off-diagonal elements in the correlation matrix;
a selecting module configured to select a codeword from the constructed codebooks; and
a feedback module configured to feed back a corresponding index of the selected codeword in the codebooks;
wherein the diagonal elements in the correlation matrix are represented by $R_{ij}$ (i=j), the off-diagonal element $R_{ij}$ in the correlation matrix are represented by $R_{ij}=\sqrt{R_{ii}R_{jj}}r_{ij}e^{j\theta_{ij}}$ (i≠j), and wherein i and j denote indexes of rows and columns of the correlation matrix, respectively.

14. An apparatus for constructing a second correlation matrix in a multi-input multi-output system, comprising:
a constructing module configured to construct codebooks for a first correlation matrix based on a conjugation nature of the first correlation matrix and a predetermined relationship between diagonal elements and off-diagonal elements in the correlation matrix, wherein the first correlation matrix has a N×N dimension, wherein N denotes the number of transmit antennas or receive antennas in the multi-input multi-output system;
a receiving module configured to receive an index of a codeword of the first correlation matrix;
an obtaining module configured to obtain a corresponding codeword from the constructed codebooks for the first correlation matrix based on the index; and
a matrix constructing module configured to construct a second correlation matrix corresponding to the first correlation matrix based on the obtained codeword;
wherein the diagonal elements in the first correlation matrix are represented by $R_{ij}$ (i=j), the off-diagonal element $R_{ij}$ in the correlation matrix are represented by $R_{ij}=\sqrt{R_{ii}R_{jj}}r_{ij}e^{j\theta_{ij}}$ (i≠j), and wherein i and j denote indexes of rows and columns of the correlation matrix, respectively.

15. A method of feeding back and constructing a correlation matrix in a multi-input multi-output system comprising a receiving end and a sending end, comprising:
constructing, at the receiving end and the sending end, codebooks for the correlation matrix based on a conjugation nature of the correlation matrix and a predetermined relationship between diagonal elements and off-diagonal elements in the correlation matrix;
at the receiving end,
selecting a codeword representing a to-be-fed-back correlation matrix from the constructed codebooks; and
feeding back an index corresponding to the selected codeword in the correlation matrix to the sending end; and
at the sending end,
receiving an index of the codeword in the correlation matrix;
obtaining the corresponding codeword from the constructed codebooks based on the index; and
constructing a further correlation matrix corresponding to the correlation matrix based on the obtained codeword;
wherein the diagonal elements in the correlation matrix are represented by $R_{ij}$ (i=j), the off-diagonal element $R_{ij}$ in the correlation matrix are represented by $R_{ij}=\sqrt{R_{ii}R_{jj}}r_{ij}e^{j\theta_{ij}}$ (i≠j), and wherein i and j denote indexes of rows and columns of the correlation matrix, respectively.

* * * * *